United States Patent
Coors

(10) Patent No.: US 7,332,237 B2
(45) Date of Patent: *Feb. 19, 2008

(54) STREAM REFORMING OF SOLID CARBON IN PROTONIC CERAMIC FUEL CELLS

(75) Inventor: W. Grover Coors, Golden, CO (US)

(73) Assignee: Protonetics International, Inc., Golden, CO (US)

(*) Notice: Subject to any disclaimer, the term of this patent is extended or adjusted under 35 U.S.C. 154(b) by 338 days.

This patent is subject to a terminal disclaimer.

(21) Appl. No.: 10/881,720

(22) Filed: Jun. 29, 2004

(65) Prior Publication Data

US 2005/0019622 A1    Jan. 27, 2005

Related U.S. Application Data

(63) Continuation-in-part of application No. 10/353,215, filed on Jan. 27, 2003, now Pat. No. 7,045,231.

(60) Provisional application No. 60/489,895, filed on Jul. 23, 2003.

(51) Int. Cl.
     *H01M 8/06*      (2006.01)
     *H01M 8/10*      (2006.01)
     *H01M 8/12*      (2006.01)
     *C01B 3/02*      (2006.01)
     *C01B 3/24*      (2006.01)

(52) U.S. Cl. .................. 429/17; 429/30; 429/33; 423/648.1; 423/650

(58) Field of Classification Search ............. None
See application file for complete search history.

(56) References Cited

U.S. PATENT DOCUMENTS 4,130,693 A    12/1978   Van Den Berghe et al.

(Continued)

FOREIGN PATENT DOCUMENTS

GB    2 206 571 A    1/1989

OTHER PUBLICATIONS

Coors, W.G. Protonic Ceramic Fuel Cells for High-Efficiency Operation with Methane, *Journal of Power Sources* 2003, 118:150-156.

(Continued)

*Primary Examiner*—Jonathan Crepeau
(74) *Attorney, Agent, or Firm*—Townsend and Townsend and Crew LLP

(57) ABSTRACT

A process for converting a carbon containing fuel and water vapor into a reformate gas that includes hydrogen, carbon monoxide and carbon dioxide, using water molecules that diffuse through a membrane by steam permeation reforming. The process includes providing a ceramic membrane comprising an oxide ceramic having intrinsic and extrinsic oxygen ion vacancies, and having first and second surfaces; where the oxide ceramic capable of reacting with gaseous water molecules at the first surface by the reversible reaction, $H_2O(g)+V_O^{..}+O^x_O \leftrightarrow 2OH^._O$; and the oxide ceramic capable of producing gaseous water molecules at the second surface by the reversible reaction, $2OH^._O \leftrightarrow H_2O(g)+V_O^{..}+O^x_O$; contacting water vapor with the first surface; contacting the reformate gas with the second surface, whereby solid state ambipolar diffusion of oxygen ion vacancies and protons across the membrane occurs; and the ambipolar diffusion produces a net diffusion flux of water molecules through the membrane from the first surface to the second surface.

29 Claims, 6 Drawing Sheets

U.S. PATENT DOCUMENTS

| | | |
|---|---|---|
| 4,810,485 A | 3/1989 | Marianowski et al. |
| 4,851,303 A | 7/1989 | Madou et al. |
| 4,927,793 A | 5/1990 | Hori et al. |
| 5,116,696 A | 5/1992 | Barp |
| 5,387,330 A | 2/1995 | Taniguchi et al. |
| 5,439,579 A | 8/1995 | Koide et al. |
| 5,496,655 A | 3/1996 | Lessing |
| 5,549,983 A | 8/1996 | Yamanis |
| 5,604,048 A | 2/1997 | Nishihara et al. |
| 5,616,223 A | 4/1997 | Shen et al. |
| 5,670,270 A | 9/1997 | Wallin |
| 5,682,261 A | 10/1997 | Takada et al. |
| 5,731,097 A * | 3/1998 | Miyashita et al. ............ 429/30 |
| 5,795,502 A | 8/1998 | Terashi et al. |
| 5,935,398 A | 8/1999 | Taniguchi et al. |
| 6,033,632 A | 3/2000 | Schwartz et al. |
| 6,059,943 A * | 5/2000 | Murphy et al. ............ 204/296 |
| 6,066,307 A | 5/2000 | Keskar et al. |
| 6,077,323 A | 6/2000 | Nataraj et al. |
| 6,214,757 B1 | 4/2001 | Schwartz et al. |
| 6,235,417 B1 | 5/2001 | Wachsman et al. |
| 6,265,093 B1 | 7/2001 | Surampudi et al. |
| 6,281,403 B1 | 8/2001 | White et al. |
| 6,338,833 B1 | 1/2002 | Aasberg-Petersen |
| 7,045,231 B2 * | 5/2006 | Coors ......................... 429/17 |
| 7,125,528 B2 | 10/2006 | Besecker et al. |
| 2002/0142208 A1 * | 10/2002 | Keefer et al. ................. 429/34 |
| 2005/0019622 A1 | 1/2005 | Coors |

OTHER PUBLICATIONS

Virkar et al., Chemical Diffusion Coefficient of $H_2O$ in $AB_{(1-x)}B^1_xO_{(3-x/2)}$-Type Perovskites, *Journal of the American Ceramic Society*, 2002, 85(12):3059-3064.

Kreuer, K.D., Aspects of Formation and Mobility of Protonic Charge Carriers and the Stability of Perovskite-Type Oxides, 1999 125:285-302.

* cited by examiner

Fuel Side
$CH_4(g) + 2H_2O_{ads} \rightarrow$
$CO_2(g) + 8H^+ + 8e^-$

Air Side
$2O_2(g) + 8H^+ + 8e^- \rightarrow$
$2H_2O(g) + 2H_2O_{ads}$

STREAM REFORMING OF SOLID CARBON IN PROTONIC CERAMIC FUEL CELLS

CROSS-REFERENCES TO RELATED APPLICATIONS

This application is a continuation-in-part of U.S. patent application. Ser. No. 10/353,215, filed Jan. 27, 2003 now U.S. Pat. No. 7,045,231, and entitled "DIRECT HYDROCARBON REFORMING IN PROTONIC CERAMIC FUEL CELLS BY ELECTROLYTE STEAM PERMEATION", the entire contents of which is herein incorporated by this reference for all purposes. This application also claims the benefit of U.S. Provisional Application Ser. No. 60/489,895, filed Jul. 23, 2003, and entitled "STEAM PERMEATION REFORMING OF SOLID CARBON IN A PROTONIC CERAMIC FUEL CELL", the entire contents of which is also herein incorporated by this reference for all purposes.

FIELD OF THE INVENTION

This application relates generally to a process that uses solid state ambipolar diffusion of protons and oxygen ion vacancies in protonic ceramic membranees to reform hydrocarbon fuels, called "steam permeation reforming", and more specifically to a protonic ceramic fuel cell that utilizes steam permeation reforming of hydrocarbon fuels to produce electric power.

BACKGROUND OF THE INVENTION

One of the advantages of fuel cells is that they can, in principle, convert the chemical energy of fuels directly into electrical energy at high efficiencies. In practice, however, some of the energy is always "lost" irreversibly as heat and unused fuel. Since the electric power is the most valuable output, one of the most important characteristics of a fuel cell design is the percentage of the available energy of the fuel that is converted into electricity. High electrical conversion efficiency requires that both the thermodynamic efficiency and fuel utilization be high. Thermodynamic efficiency is an intrinsic property of the energy conversion device, and depends on the reaction steps by which fuels undergo oxidation. In general, fuel cells have the advantage of higher thermodynamic efficiency than conventional heat engines. Fuel utilization determines how much of the fuel entering the device is actually converted into carbon dioxide and water vapor. Most fuel cells designed to operate directly on hydrocarbon fuels suffer from poor fuel utilization. Currently, diesel-electric generators are available that convert about 40% of the heat content of diesel fuel into electricity. Gas turbine/electric generators have a practical upper limit of about 50%. Thus, fuel cells designed to operate directly on hydrocarbon fuels must exceed 50% net electrical efficiency in order to be commercially viable for distributed electric power generation in direct competition with centralized utilities.

Fuel cells have been proposed for many applications including stationary electric power generation and electrical vehicular power plants to replace internal combustion engines. Hydrogen is often used as the fuel and is supplied to the fuel cell's anode. Oxygen (typically as air) is the cell's oxidant and is supplied to the cell's cathode. Hydrogen used in the fuel cell can be derived from the reformation of natural gas (methane), propane, methanol, ethanol or other hydrocarbon fuels. Complete conversion of hydrocarbon fuels to carbon dioxide and hydrogen requires a 2-step process. First, the fuel is steam reformed by reaction with water vapor (steam) to produce carbon monoxide and hydrogen. This reaction is given below for methane, but may be generalized for any hydrocarbon.

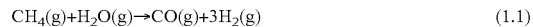

$$CH_4(g)+H_2O(g) \rightarrow CO(g)+3H_2(g) \tag{1.1}$$

Next, the carbon monoxide is reacted with additional steam by the "water gas shift" reaction,

$$CO(g)+H_2O(g) \rightarrow CO_2(g)+H_2(g) \tag{1.2}$$

These reactions are accomplished heterogeneously at catalytically active surfaces within a chemical reactor. The chemical reactor provides the necessary thermal energy throughout the catalyst to yield a reformate gas comprising hydrogen, carbon dioxide, carbon monoxide, and water vapor, depending on the chemical equilibrium. One such reformer is described in U.S. Pat. No. 4,650,727 to Vanderborgh.

In certain fuel cells operating directly on hydrocarbon fuels at elevated temperatures, it is not necessary to convert the fuel into hydrogen beforehand. The reforming and shift reactions are carried out in the cell, at or near the anode. Steam is injected into the gaseous fuel stream entering the cell. Only two water molecules are actually required for each carbon in the fuel in order to complete the reactions, but typically a higher steam to carbon ratio is used to enhance the production of the desired reaction product, hydrogen. High temperature fuel cells operating directly on hydrocarbon fuels are plagued by the propensity of hydrocarbons to pyrolize spontaneously on the catalyst into atomic carbon and hydrogen. This process, called "coking", occurs when there is insufficient steam in the immediate vicinity of any hydrocarbons adsorbed on the surface of the catalyst to complete the hydrocarbon reforming reaction before pyrolysis occurs. These carbon deposits foul, and eventually destroy, the cell.

Recently, certain fuel cells based on oxide ion conducting electrolyte ceramic membranes have been developed that oxidize hydrocarbon fuels directly at the anode, without the need to supply externally injected steam. That is, dry hydrocarbon fuels at the anode react with oxygen ions passing through the electrolyte to produce carbon dioxide and water vapor directly. These fuel cells have the advantage of higher thermodynamic efficiency and greater simplicity than other intermediate and high temperature fuel cells, but still suffer from the problems of coking and poor fuel utilization.

BRIEF SUMMARY OF THE INVENTION

The present invention describes a process that makes it possible to use dry hydrocarbon fuels in a fuel cell and a process of utilizing the fuel cell to convert the chemical energy of the fuels directly into electrical energy. The present invention includes fuel cells that directly reforms hydrocarbon fuels at the anode using a process of steam permeation reforming. The present invention also includes fuel cells that reform solid carbon fuels (e.g., coal, biomass, etc.) in an anode chamber using steam permeation reforming. The fuel cell of the present invention comprises a metallic or mixed conducting anode, a metallic or mixed conducting cathode, a dense, proton-conducting ceramic electrolyte (i.e. without open porosity) between the anode and the cathode, and an external load connecting the anode and the cathode. The fuel cell also includes systems for bringing gaseous hydrocarbon fuels into direct contact with the anode (also referred to as the fuel side) and for bringing oxygen into contact with the cathode (also referred to as the air side).

Water vapor in the fuel cell passes through the ceramic electrolyte membrane from the air side to the fuel side by the process of steam permeation. This process uses the partial pressure gradient (or chemical activity gradient) of water vapor that exists between the air side and the fuel side to transport water molecules from the higher partial pressure at the air side to the lower partial pressure at the fuel side. The water vapor partial pressure is generally lower at the fuel side than at the air side because the water vapor partial pressure at the air side is always greater than or equal to the ambient relative humidity, whereas, any water vapor that appears at the fuel side is rapidly consumed in reactions with hydrocarbon molecules and carbon monoxide, reducing the water vapor partial pressure to a low level.

The mechanism of steam permeation is by solid state ambipolar diffusion, or counter-diffusion of oxygen ion vacancies ($V_O^{\cdot\cdot}$) and protons attached to oxygen sites ($OH_O^{\cdot}$) in the ceramic electrolyte. This is strictly a solid-state phenomenon involving only transport of ions. Ambipolar diffusion is possible without any net current flow because oxygen ion vacancies and protons on oxygen sites both carry positive charge. Protons can move in one direction while oxygen ion vacancies—one oxygen ion vacancy for every two protons—move in the opposite direction without any net charge transport. This is a unique characteristic of a class of ceramic materials having extrinsic (and/or intrinsic) oxygen ion vacancy defects that interact at the surface with water vapor to become "protonated" by the reversible reaction (in Kroger-Vink notation),

$$H_2O(g)+V_O^{\cdot\cdot}+O_O^x \leftrightarrow 2OH_O^{\cdot} \qquad (1.3)$$

In reaction (1.3), the symbol, ↔, is used to denote reversibility. The symbol, $V_O^{\cdot\cdot}$, refers to a vacancy in the oxygen sub-lattice. Since the missing oxygen ion carries two negative charges, in order to compensate for the charge imbalance, the resulting vacancy possesses the equivalent of two positive charges, as denoted by the two superscript dots. The symbol, $O_O^x$, refers to a neutral oxygen ion on a normal oxygen site in the oxygen sub-lattice. The symbol, $OH_O^{\cdot}$, refers to a neutral oxygen ion on a site in the oxygen sub-lattice, shared by a proton with a single positive charge, denoted by the superscript dot.

Reaction 1.3 occurs reversibly at the solid/vapor interface region between the solid electrolyte and the surrounding gas. With reference to FIG. 1, the effect of steam permeation by ambipolar diffusion is shown. For clarity, only the oxygen ion sub-lattice of the ceramic electrolyte membrane is shown. Oxygen ion vacancies 110 at the surface of the ceramic electrolyte 112 on the air side 114 are annihilated by reaction with water vapor 116 to produce two protons on oxygen sites 111 according to reaction (1.3). The reverse of reaction (1.3) occurs at the fuel side 118, creating oxygen ion vacancies and water vapor. The water vapor is consumed by reaction with any hydrocarbon molecules 120 and carbon monoxide 122 present. This results in a concentration gradient in oxygen ion vacancies and a reverse concentration gradient in protons attached to oxygen sites ($OH_O^{\cdot}$) across the electrolyte. Oxygen ion vacancies diffuse through the ceramic electrolyte membrane from the fuel side to the air side through the stationary oxygen ion sub-lattice, by the conventional mechanism of vacancy transport in ionic solids. Protons diffuse from the air side to the fuel side by hopping between oxygen ions. Oxygen atoms are added to the oxygen ion sub-lattice at the air side at exactly the same rate they are removed from the fuel side. (Otherwise, the thickness of the ceramic membrane would change with time.) Although net transport of oxygen atoms from the air side to the fuel side does take place, it is the entire oxygen sub-lattice that moves from the air side to the fuel side, so that there is no net motion of individual oxygen ions with respect to the mobile oxygen ion vacancies, which would otherwise transport charge. The effect is shown schematically in FIG. 1.

In the process of steam permeation reforming, water vapor that appears at the fuel side by steam permeation through the electrolyte is consumed in reactions with the hydrocarbon molecules to produce hydrogen and carbon monoxide (CO) by reaction (1.1) and hydrogen and carbon dioxide ($CO_2$) by reaction (1.2). Since the partial pressure gradient of water vapor across the protonic ceramic membrane determines the steam permeation rate, the appearance of water vapor at the fuel side for reaction with the hydrocarbon fuels is self-regulating, so that only as much water vapor as is required for the reforming of hydrocarbons is delivered. That is, any excess water vapor that appears at the fuel side dynamically reduces the water vapor partial pressure gradient, and thus, reduces the flux of water molecules through the membrane. Also, in this process, the water vapor available at the fuel side by permeation reduces or eliminates the propensity of hydrocarbons at the anode to pyrolyze into carbon residue (i.e., coking) since an absorbed layer of water vapor is always present on the surface of the catalyst whenever a gaseous hydrocarbon molecule arrives. Also, steam permeation occurs independently of whether or not the cell is delivering current to an external load, so coking is obviated even at open circuit.

For the process of steam permeation, no electrodes are necessary. Protons diffuse from the air side to the fuel side due to only the concentration gradient of protons and oxygen ion vacancies. When electrodes are attached to the ceramic electrolyte membrane, protons are free to simultaneously migrate back from the fuel side to the air side whenever the fuel cell is delivering electric power to an external load. In this sense, protons traveling from the air side to the fuel side constitute the steam permeation flux, while protons traveling from the fuel side to the air side constitute the Faradaic flux. Other than normal charged particle interactions, these two fluxes are totally independent.

Hydrogen produced at the fuel side by the reaction of steam with hydrocarbons by reaction (1.1) or with carbon monoxide by reaction (1.2) is adsorbed on the surface, and enters the anode by electrochemical oxidation to produce electrons and hydrogen ions. The electrons flow through an external load, and the hydrogen ions (protons) traverse the electrolyte by hopping from oxygen site to oxygen site, by the so-called Grotthuss mechanism. It is these protons that carry the Faradaic current through the ceramic membrane when the fuel cell is operating under load. These protons are electrochemically combined at the cathode with oxygen (typically from air) and electrons coming from the external load to produce water vapor and electric power. For example, four molecules of $H_2O$ are produced at the cathode for every methane molecule consumed at the anode (assuming the carbon is completely oxidized to $CO_2$). Under steady state conditions, two of these water molecules permeate back to the fuel side for subsequent reforming, and the remaining two water molecules are expelled from the cell as exhaust. Since dry hydrocarbon fuels are supplied directly to the fuel cell, high thermodynamic efficiency is obtained. Since any hydrogen produced at the anode is transported to the air side when current is flowing through the external circuit, reaction equilibrium is shifted strongly toward $CO_2$ production when the fuel cell is operating under load. Since $CO_2$ is the only exhaust gas produced at the anode, high fuel utilization is possible with this design.

In various embodiments, the proton-conducting ceramic electrolyte can have a protonic conductivity of at least about 5 millisiemens per centimeter at a temperature of 700° Celsius. The electrolyte is non-conducting with respect to electrons, with an ionic transference number greater than about 0.8, and has a thickness less than about 1 millimeter. In one embodiment, the proton-conducting ceramic electrolyte is a perovskite ceramic and particularly, consists of oxides of barium, cerium and yttrium having a nominal stoichiometry of $BaCe_{0.9}Y_{0.1}O_{2.95+\delta}$. ($\delta$ in the molecular formula refers to the mole fraction of vacant oxygen sites in the lattice, which may vary from $\delta=0.05$, where all possible oxygen ion vacancies are filled, to $\delta=0$, where all possible oxygen ion vacancies are empty.)

In a further embodiment, the metallic anode is stable at elevated temperatures in a reducing atmosphere and catalytically active with respect to the steam reforming and water gas shift reactions of hydrocarbon fuels. For example, the anode can be a platinum or nickel/nickel alloy anode less than about 20 microns in thickness applied to one side of the electrolyte, and capable of operating at temperatures less than about 850° Celsius.

In a further embodiment, the metallic cathode is stable against oxidation and corrosion in moist, oxidizing atmospheres at elevated temperatures. For example, the cathode can be a platinum, high nickel alloy, or mixed protonic/electronic conducting ceramic cathode less than about 20 microns in thickness applied to the opposing side of the electrolyte, and capable of operating at temperatures less than about 850° Celsius.

In a further embodiment, a thin electrolyte layer of protonic ceramic is deposited on a porous supporting anode substrate. For example, the anode support can be a mixture of nickel, nickel oxide and metal oxides with a thickness less than about 1 millimeter. A thin cathode layer is deposited on the opposing side of the thin electrolyte.

In a further embodiment, a thin electrolyte layer of protonic ceramic is deposited on a porous supporting cathode substrate. For example, the cathode can be a mixture of metals and metal oxides with a thickness of less than about 1 millimeter. A thin anode layer is deposited on the opposing side of the electrolyte.

The present invention also describes a process of using the above-described fuel cell for producing electrical energy by converting the chemical energy of the fuel into electrical energy through electrochemical oxidation.

These and other objects, features, and advantages of the invention will become apparent from the following best mode description, the drawings and the claims.

BRIEF DESCRIPTION OF THE DRAWINGS

The figures that follow depict a preferred embodiment of the invention, and may depict various alternative embodiments. The invention is not limited to the embodiment or embodiments depicted herein since even further various alternative embodiments will be readily apparent to those skilled in the art.

DETAILED DESCRIPTION OF THE INVENTION

This invention comprises a fuel cell that utilizes steam permeation reforming. The following describes a preferred embodiment of the invention, and various alternative embodiments. It should be readily apparent to those skilled in the art, however, that various other alternative embodiments are encompassed without departing from the spirit or scope of the invention.

Figure 2:
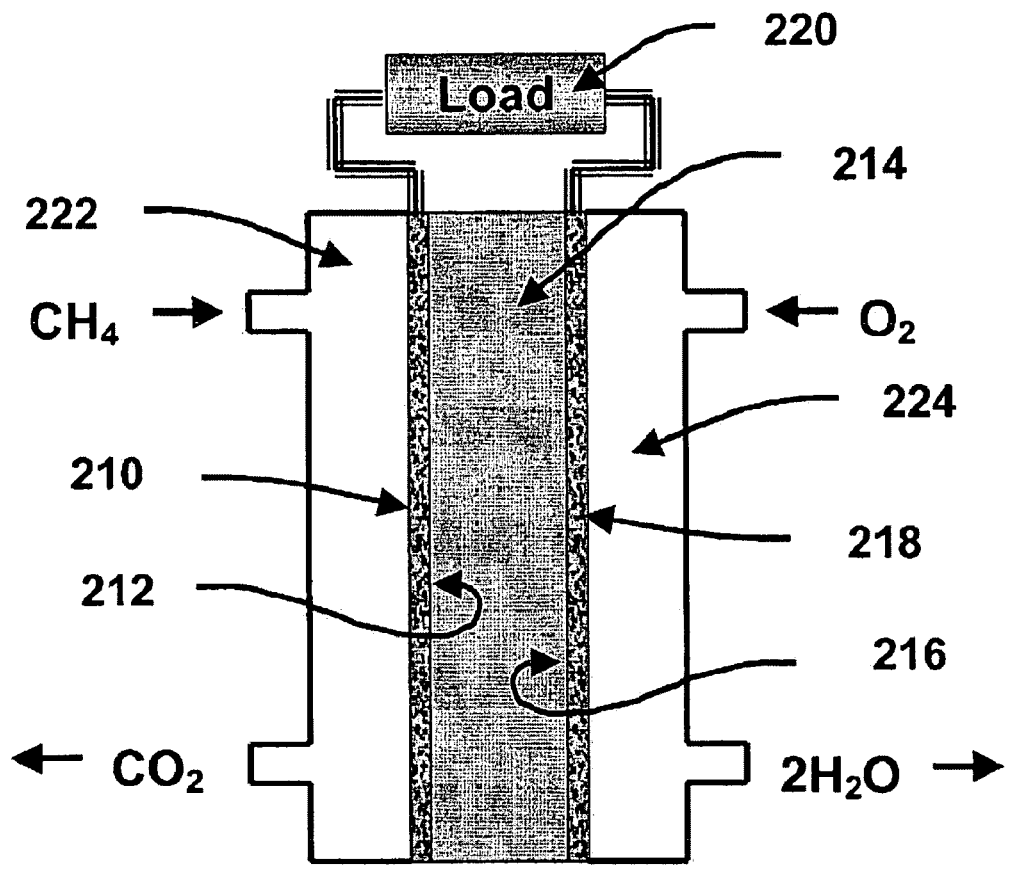
FIG. 2 depicts a protonic ceramic fuel cell according to the present invention, including a representation of a water vapor gradient from the air side to the fuel side.

As shown in FIG. 2, the fuel cell comprises an anode 210, a proton-conducting ceramic electrolyte 214, an interface region 212 between the gas phase in the vicinity of the anode 210 and some portion of the first surface of the ceramic electrolyte membrane 214, a cathode 218, an interface region 216 between the gas phase in the vicinity of the cathode 218 and some portion of the second surface of the ceramic electrolyte 214, and an external load 220 connecting the anode and the cathode. The fuel cell also includes a system 222 for bringing gaseous hydrocarbon fuels into contact with the anode 210 and the second surface 212 of the ceramic electrolyte membrane 214, and a system 224 for bringing oxygen into contact with the cathode 218 and water vapor into contact with the first surface 216 of the ceramic electrolyte membrane 214.

The proton-conducting electrolyte membrane 214 is a dense, sintered ceramic, which is impervious to gaseous diffusion, so that direct mixing of fuel from the anode side and oxidant gases from the cathode side cannot occur. Ideally, protons and oxygen ion vacancies are the only charged mobile species in the electrolyte ceramic at the operating temperature. In practice, however, some electronic conductivity is inevitable. The ratio of the ionic conductivity to the total conductivity, including electronic conductivity, is called the transference number. A transference number as close to unity as possible is desired, but practical devices may have a transference number as low as about 0.8.

The anode 210 and the cathode 218 serve multiple simultaneous functions. First, they must have sufficient porosity to permit gaseous water molecules to diffuse freely between the gas phase and the surfaces of the ceramic electrolyte. Second, they must have sufficient electronic conductivity to collect the current generated by the fuel cell and drive the external load, without contributing undue parasitic resistance. This means that each electrode must maintain a continuous electrical path throughout the electrode structure, while making good electrical contact with current collecting components between the electrodes and the external load and maintaining strong mechanical contact with the respective ceramic electrolyte surfaces. The electrodes are metals, metallic alloys, metallic and oxide composites, mixed conducting oxides or semiconductors. In particular, the anode can be selected from a metallic platinum, a nickel/nickel alloy, and a mixture of nickel oxide and oxide ceramic, and can be capable of operating at temperatures less than about 850° C. The cathode can be selected from a platinum, a nickel alloy, and a mixed protonic/electronic conducting ceramic cathode less than about 20 microns in thickness, and be capable of operating at temperatures less then about 850° C.

Many metals, such as nickel and platinum, besides being good electronic conductors, are also good protonic conductors, making them good mixed electronic/protonic conductors. Many mixed conducting ceramic oxides may also be used as electrodes. Finally, the electrode surfaces must be catalytically active with respect to the electrochemical reactions that must take place. Nickel is an ideal anode material because it is a good catalyst for many reactions involving hydrocarbon molecules. Platinum is also a very good anode metal, and various alloys exist with optimized reaction-specific catalytic properties. Pure nickel is unsuitable for use as a cathode metal because it readily oxidizes in air at elevated temperatures. Platinum makes the best cathode metal, but due to its high cost, oxidation resistant nickel and chromium alloys may be used. Also, many mixed-conducting oxide ceramic materials may be used.

The fuel cell may be constructed as 1) electrolyte-supported, where a thin anode and a thin cathode are applied to a relatively thick structural electrolyte layer, 2) anode-supported, where a thin membrane of electrolyte material is applied to a relatively thick structural anode layer, and a thin cathode is applied to the first surface of the electrolyte, 3) cathode-supported, where a thin membrane of electrolyte material is applied to a relatively thick structural cathode layer, and a thin anode is applied to the second surface of the electrolyte, and 4) sandwiched electrolyte, where a thin layer of electrolyte is sandwiched between relatively thick layers of the anode on the first surface and the cathode on the second surface.

Some portion of the electrolyte membrane 214 on the air side of the fuel cell must be in direct contact with the gas phase of the cathode chamber 222 so that water vapor molecules in the air are free to diffuse to the surface of the ceramic. Some portion of the electrolyte membrane 214 on the fuel side of the fuel cell must be in direct contact with the gas phase of the anode chamber 220 so that water vapor molecules produced at the surface of the ceramic in the vicinity of the anode are free to diffuse into the fuel gas or diffuse along the surface of the anode to come into contact with the fuel gas molecules. In operation, water vapor passes through the electrolyte 214 from the interface with the air side 216 to the interface with the fuel side 212 by ambipolar diffusion, also called steam permeation, without conducting current, whenever a water vapor concentration gradient exists across the electrolyte 214. The present invention also describes a process of using the above-described fuel cell for producing electrical energy by converting the chemical energy of hydrocarbon fuels directly into electrical energy through known processes, including but not limited to electrochemical oxidation.

Certain chemical and electrochemical reactions take place in the fuel cell of the present invention. Hydrogen gas and/or adsorbed hydrogen atoms are produced from gaseous hydrocarbons by steam reforming (1.1) and water gas shift (1.2) reactions at the anode at elevated temperatures in the presence of suitable catalysts. At open circuit (when the cell is not delivering current to the external load), these reactions proceed by steam permeation until all hydrocarbons and carbon monoxide in the vicinity of the anode are consumed. Since water vapor is no longer consumed in reactions with hydrocarbons or carbon monoxide, further steam permeation causes the water vapor partial pressure to rise on the fuel side. Once the water vapor partial pressure is equilibrated with the air side, the concentration gradient disappears, and further steam permeation ceases. Thus, steam permeation is naturally self-regulating, delivering only as much water vapor to the fuel side as required by the gases present.

For each mole of methane converted completely to $CO_2$, eight moles of hydrogen atoms are generated. When the fuel cell is delivering current to the external load, hydrogen is oxidized at the anode by the reaction,

$$2H_{ads} \rightarrow 2H^+_{i,a} + 2e' \tag{1.4}$$

and oxygen is reduced at the cathode by the reaction,

$$2H^+_{i,c} + \tfrac{1}{2}O_2(g) + 2e' \rightarrow H_2O_{ads} \tag{1.5}$$

The subscript, i,a, refers to interstitial hydrogen ions in the anode and i,c, refers to interstitial hydrogen ions in the cathode The net cell reaction is responsible for the electromotive force that causes the electrons to do work on the external load.

The overall reaction at the anode, using methane as typical of hydrocarbon fuels, (shown in FIG. 2) is,

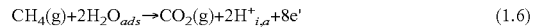
$$CH_4(g) + 2H_2O_{ads} \rightarrow CO_2(g) + 2H^+_{i,a} + 8e' \tag{1.6}$$

Carbon dioxide is the only gaseous product. It is inert in the fuel cell, and exits the cell as exhaust.

The overall reaction at the cathode is,

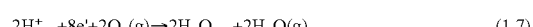
$$2H^+_{i,c} + 8e' + 2O_2(g) \rightarrow 2H_2O_{ads} + 2H_2O(g) \tag{1.7}$$

Four water molecules are produced for each methane molecule consumed at the anode. Two of these molecules pass out of the air side of the cell as exhaust gas, while the remaining two water molecules permeate back through the electrolyte to the fuel side.

With reference to FIG. 2, the present invention, like most fuel cells, has a metallic anode 210 that can be made of any metallic material and, preferably, is selected from the transition metals of the periodic Table of Elements, either as an individual element or combination of elements. These selected elements can also be alloyed with other elements of said Table of Elements. These selected elements may also be used as oxides and mixtures of metals and oxides. The present invention also has a metallic cathode 218 that can also be made of any metallic material, and, preferably, is selected from the alloys such as those containing palladium, platinum, nickel, chromium, cobalt, selenium, tellurium and other selected elements. The metallic cathode may also contain metallic oxides and mixed conducting metallic oxides.

The present invention further includes a proton-conducting ceramic electrolyte 214 that is placed between the anode and the cathode. The electrolyte, while conducting protons through the electrolyte, also provides insulation with respect to the electrons so that a short circuit between the anode and the cathode does not occur.

The ceramic electrolyte can be any high temperature ceramic electrolyte that conducts protons while also providing insulation with respect to electrons to prevent a short circuit between the anode and the cathode. For the present invention, it is preferred that the ceramic have an ionic transference number greater than about 0.8, more preferably greater than about 0.9, and more preferably greater than about 0.99. The ceramic chosen for use with the fuel cell should also be capable of being doped with aliovalent cations to create extrinsic oxygen ion vacancies. Many suitable polycrystalline ceramics also have intrinsic and extrinsic oxygen ion vacancies.

Preferred proton-conducting ceramic electrolytes of the present invention have a thickness of less than about 1 millimeter, more preferably less than about 0.2 millimeter, and more preferably less than about 0.05 millimeter.

The preferred ceramic electrolyte can be any perovskite ceramic. The more preferred ceramic electrolyte is a polycrystalline, perovskite ceramic with a nominal stoichiometry of $BaCe_{0.9}Y_{0.1}O_{2.95+\delta}$. This formulation is referred to as BCY10.

The concentration and mobility of protonic defects, $OH^{\cdot}_O$, determines the protonic conductivity of the ceramic. For the present invention, a protonic conductivity above at least about 5 millisiemens per centimeter at a temperature of 700° Celsius is preferred. Even more preferred is a protonic conductivity of at least about 10 millisiemens per centimeter at a temperature of 700° Celsius, and even more preferred is a protonic conductivity of at least about 25 millisiemens per centimeter at a temperature of 700° Celsius. When only protons diffuse through the material, an electrical current results because the protons carry a positive charge. But, when both protons and oxygen ion vacancies diffuse through the material simultaneously in opposite directions, no net current flows since protons and oxygen ion vacancies are both positively charged. This mechanism is referred to as ambipolar diffusion, and gives rise to the motion of protons and oxygen ion vacancies under the influence of concentration gradients. Ambipolar diffusion ensures local electroneutrality. Since local electroneutrality is assured, the protonation reaction (1.3) is independent of any electrical potential gradients.

Figure 3:
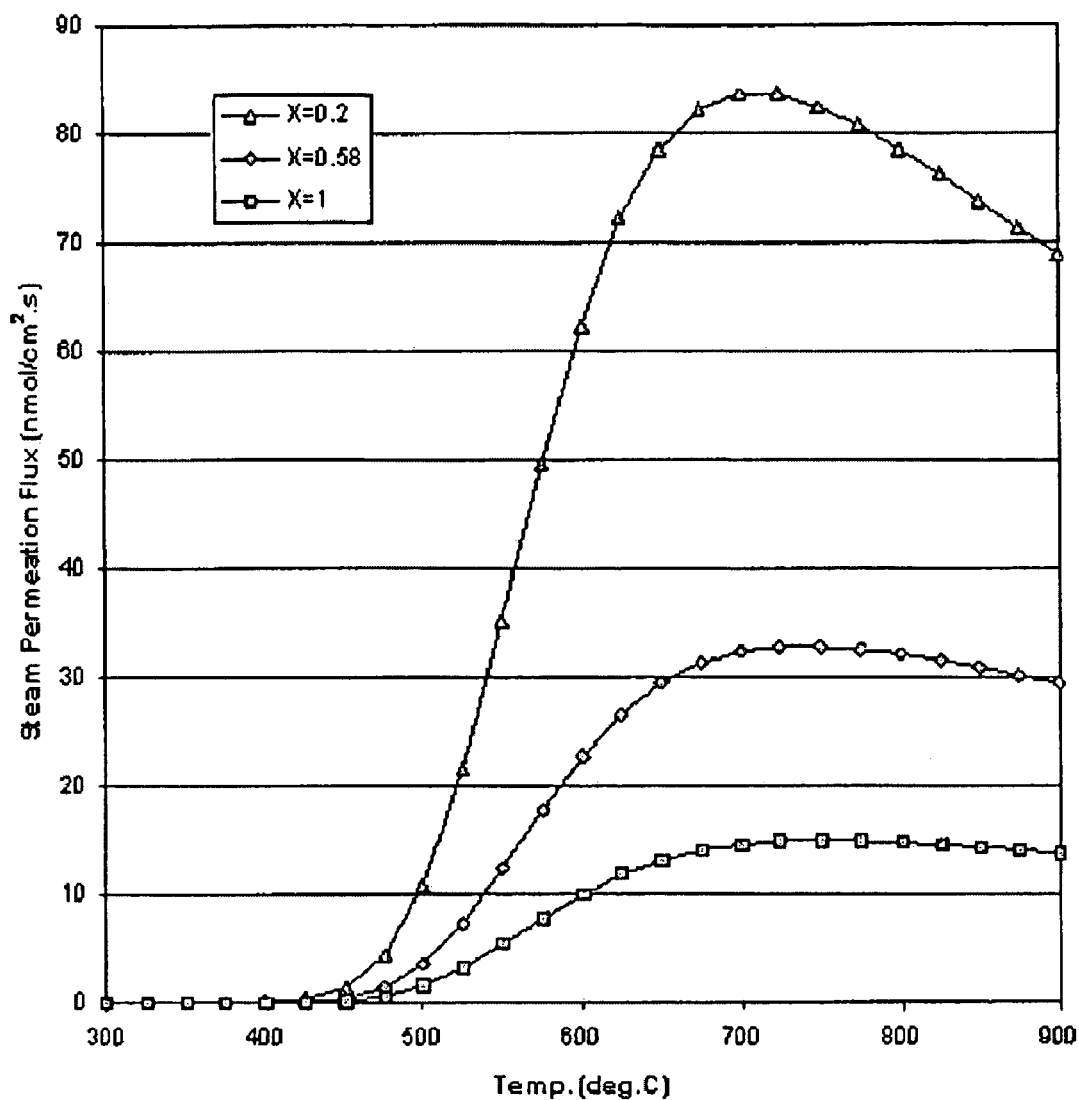
FIG. 3 graphically depicts the flux of steam permeation and the effect that temperature has on steam permeation through the electrolyte, based on the equilibrium constant for the reversible reaction (1.3) (Based on the reaction equilibrium constant determined by K. D. Kreuer, Solid State Ionics, 86-88, 1996)

It can be seen from FIG. 3 that a large $OH^{\cdot}_O$ concentration gradient can exist across the electrolyte with only an order of magnitude difference in steam partial pressure. Thus, for a fuel cell constructed according to the present invention where the steam partial pressure at the fuel side is much lower than at the air side, protonation will occur mostly at the first surface of the ceramic exposed to air where the partial pressure of water vapor is determined by the relative humidity or the saturated water vapor pressure in the vicinity of the cathode at the cell operating temperature.

Figure 1:
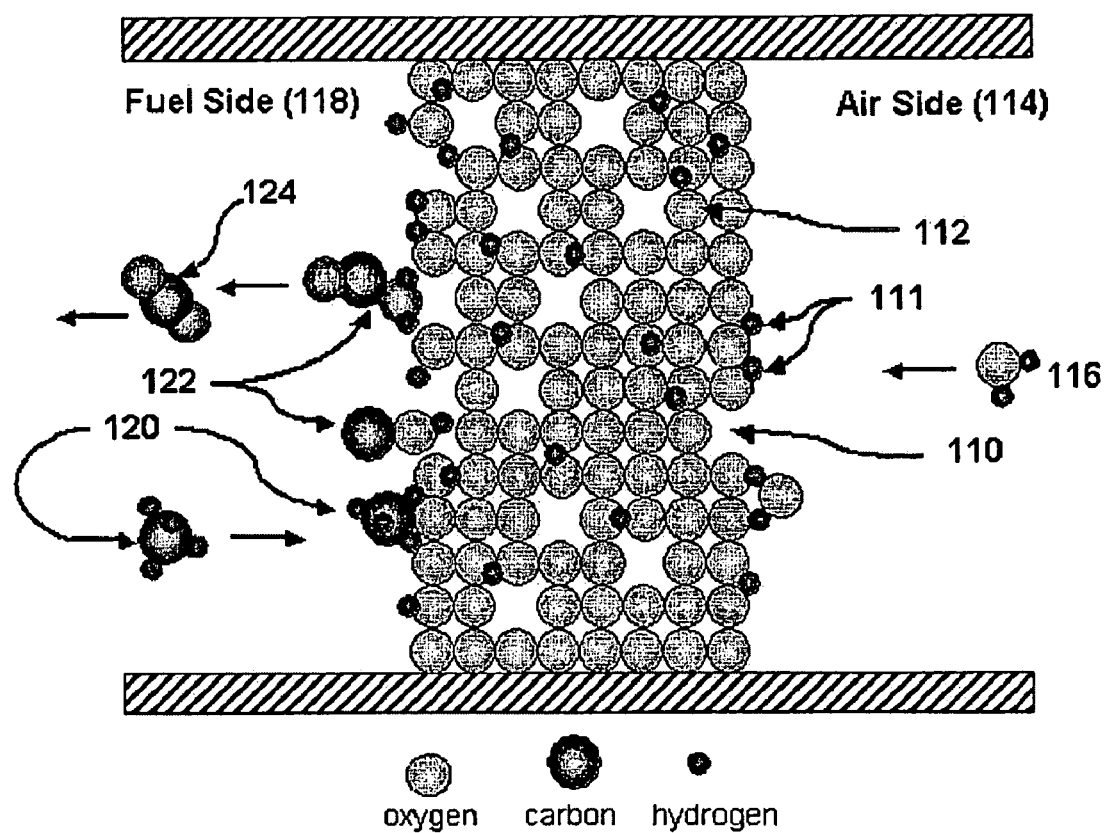
FIG. 1 graphically illustrates the mechanism of steam permeation reforming.

As noted above, the phenomenon of steam permeation occurs in a protonic ceramic electrolyte independently of any electrodes, but when electrodes are present, the electrodes must be sufficiently porous to allow water vapor to freely pass from the gas phases to the surfaces of the ceramic electrolyte membrane. Steam permeation occurs in a protonic ceramic electrolyte whenever there is a concentration gradient (or partial pressure gradient) in water vapor across the electrolyte. The partial pressure of water vapor at the cathode of the fuel cell is typically high due to production of water vapor in the reaction occurring at the cathode (1.7). The water vapor partial pressure is typically low at the anode, due to the consumption of water vapor in the hydrocarbon reforming reactions occurring at the anode and any water shift reactions that may also occur. Thus, a water vapor gradient is created, as shown in FIG. 1. Water molecules diffuse through the electrolyte from the air side to the fuel side, while oxygen ion vacancies diffuse from the fuel side to the air side. The flux of water molecules through the electrolyte is proportional to the concentration gradient and is self-regulating to deliver only as much water vapor as the hydrocarbon reforming and water shift reactions require. Any surplus water vapor at the anode will rapidly increase the partial pressure of the water vapor at the fuel side, thereby decreasing the water vapor partial pressure gradient across the electrolyte, and reducing the flux of water molecules across the electrolyte.

Oxygen ion vacancies in the electrolyte are created by dehydration (reverse of reaction 1.3) and, thus, have their highest concentration close to the fuel side of the ceramic electrolyte membrane. The rate at which water molecules can diffuse through the electrolyte is determined by the mobility of oxygen ion vacancies, which must diffuse from the fuel side to the air side, where the vacancies are annihilated by the protonation by reaction (1.3). It should be understood that the mobility of the oxygen ion vacancies is lower than that of the protons that diffuse through the electrolyte, so that the steam permeation flux is controlled by the oxygen ion mobility, and not the proton mobility.

Oxygen ion vacancies in the electrolyte are created by dehydration (reverse of reaction 1.3) and, thus, have their highest concentration close to the fuel side of the ceramic electrolyte membrane. The rate at which water molecules can diffuse through the electrolyte is determined by the mobility of oxygen ion vacancies, which must diffuse from the fuel side to the air side, where the vacancies are annihilated by the protonation by reaction (1.3). It should be understood that the mobility of the oxygen ion vacancies is lower than that of the protons that diffuse through the electrolyte, so that the steam permeation flux is controlled by the oxygen ion mobility, and not the proton mobility.

EXAMPLES

A series of experiments were performed that involved measuring the current and voltage of single cells as a function of temperature and elapsed time with various hydrocarbon fuels. The cells were typically operated at temperatures ranging from 600° C. to 850° C. Numerous cells were tested with different electrolyte thicknesses and electrode metals, but otherwise nearly identical construction. In all of the experiments, the cells consisted of an anode, a cathode, and a 23 millimeter diameter 10% yttrium-doped barium cerate, BCY10, ceramic electrolyte disc. The electrolyte thickness ranged from 0.2 millimeters to 1.0 millimeter. All of the cells tested were of the electrolyte-supported type.

A detailed description of one of the experiments, that is typical of many other experiments performed is as follows: A disc of BCY10 protonic ceramic electrolyte was prepared by the traditional powder compaction and sintering method, using powder obtained from Praxair Specialty Ceramics. The disc was fired at 1440° C. for 8 hours to 99% of theoretical density. The fired disc was ground on each face with a 220 grit diamond wheel to a thickness of 200 microns, and the diameter of the disc was left unground at about 23 mm. The cathode and anode surfaces of the disc were painted with a coating of porous, thick film platinum (Englehard A6101), and sintered for one hour at 1000° C. The completed membrane-electrode assembly, MEA, consisted of the ceramic electrolyte with a platinum cathode and anode, manufactured to be as flat as possible.

The cell was constructed by sandwiching the MEA between two 1" diameter by {fraction (3/16)}" thick nickel alloy discs, that had been lapped flat and parallel on both faces. Two {fraction (1/16)}" diameter by 14" long stainless steel tubes extended radially from the edge of each disc, like a "lollipop." The anode disc had a spiral groove milled into its top surface. High purity hydrogen or methane gas was introduced into the anode through one of the stainless steel tubes that connected to the spiral channel via a transverse hole in the center of the anode disc surface. The fuel flowed through the spiral channel formed by the spiral groove in the anode disc and the anode surface of the MEA, and exited the cell through a second transverse hole at the end of the channel near the periphery of the anode disc, and out through a second stainless steel tube, serving as the exhaust port. The total length of the spiral channel beneath the MEA anode was about 10 inches, so that methane flowing through the channel had a long residence time in the cell for reaction. Both the fuel inlet and exhaust tubes had a ceramic sleeve insert that extended the length of the tube to prevent coking of methane on the walls of the stainless steel tube external to the cell. Since steam for reforming is only present in the immediate vicinity of the anode surface of the MEA, it was necessary to prevent coking of hydrocarbons in the tubes outside the cell that would, otherwise, plug up the tubes.

A wire mesh was placed between the cathode surface of the MEA and the cathode disc to serve the dual function of cathode current collection and air distribution. The screen was made from 20 mesh 316 stainless steel, 22.3 mm in diameter. Finally, the cathode disc was placed on top of this air distribution screen. A series of radial channels were milled into the bottom surface of the cathode disc to promote air flow, and a transverse center hole interconnected to one of the stainless steel tubes. Low pressure compressed room air was provided to the cathode disc through this tube from a simple aquarium diaphragm pump. The second stainless steel tube in the cathode disc served only as a secondary electrical connection for 4-terminal measurements.

The completed cell, consisting of a cathode disc, air distribution screen, MEA, and anode disc, was rigidly held together in a clamping fixture. The clamping fixture consisted of a 11/4" square by {fraction (3/16)}" thick stainless steel base plate and a matching {fraction (1/16)}" thick stainless steel top plate. Four 10-32 by 141 long machine screws insulated by ceramic sleeves passed through the top plate and screwed into the base plate at the four corners, aligning the circular cell components in the center between these corner screws. By carefully applying torque to each of the screws it was possible to seal the spiral anode channel without damaging the delicate MEA. A small amount of fuel leakage was inevitable, and the slightly higher gas pressure within the cell channel with respect to ambient pressure prevented air from infiltrating the anode channel. The lap seal between the MEA and the anode disc provided the necessary compliance for the thermal cycling required for the experiment.

The cell assembly was inserted into a 2" diameter alumina ceramic process tube in a horizontal electric tube furnace. The four stainless steel tubes, two extending from the cathode disc and two extending from the anode disc, plus a type-K thermocouple mounted directly below the cell fixture, extended out of the furnace process tube through an endcap assembly to support and electrically isolate the stainless steel tubes and thermocouple coming out of the furnace. The anode fuel supply tube was connected directly to either reagent grade compressed hydrogen or methane using clear vinyl tubing. The fuel pressure was typically about 5 pounds per square inch. The anode exhaust tube was connected through a separate piece of vinyl tubing to a water bubbler, to observe the fuel flow rate through the cell, or connected to a gas sample collection bag, so that the exhaust gas could be analyzed for reaction products.

For determining current density, the active surface area of the cell was estimated to be $4.0\pm0.2$ cm$^2$. Electrical contacts were made to the anode and cathode discs via the stainless steel tubes in a 4-terminal configuration. The cell voltage and current were measured with a programmable dc electronic load manufactured by Chroma ATE Inc. (model 63103 with a model 6312 load module). This instrument was controlled over a general purpose interface bus, GPIB, from a LabView program running on a desk-top computer. With this experimental set-up, it was possible to automatically acquire temperature and current vs. voltage data for the device under test, as required.

Under computer control, a series of current vs. voltage characteristic curves was obtained between 650° C. and 850° C. and back to 650° C. with the furnace programmed to make each transit in 12 hours (about 16.7.degree. C./hour). The increasing and decreasing temperature scans were repeated continuously throughout the duration of the test. The cell was initially operated for about 75 hours on pure hydrogen, then switched over to pure methane for several additional 24 hour cycles. Two types of data were obtained as a function of temperature and elapsed time; traditional current-voltage (I-V) characteristic curves, and area specific resistance, ASR. ASR values were obtained about every minute by determining the slope of the I-V curve at a constant current of 50 mA/cm$^2$. The logarythm of the ASR was plotted as a function of reciprocal temperature in a conventional Arrhenius plot to give information about the activation energies of controlling kinetic processes in the cell at different temperatures and to observe slight variations in cell performance with elapsed time.

Figure 4:
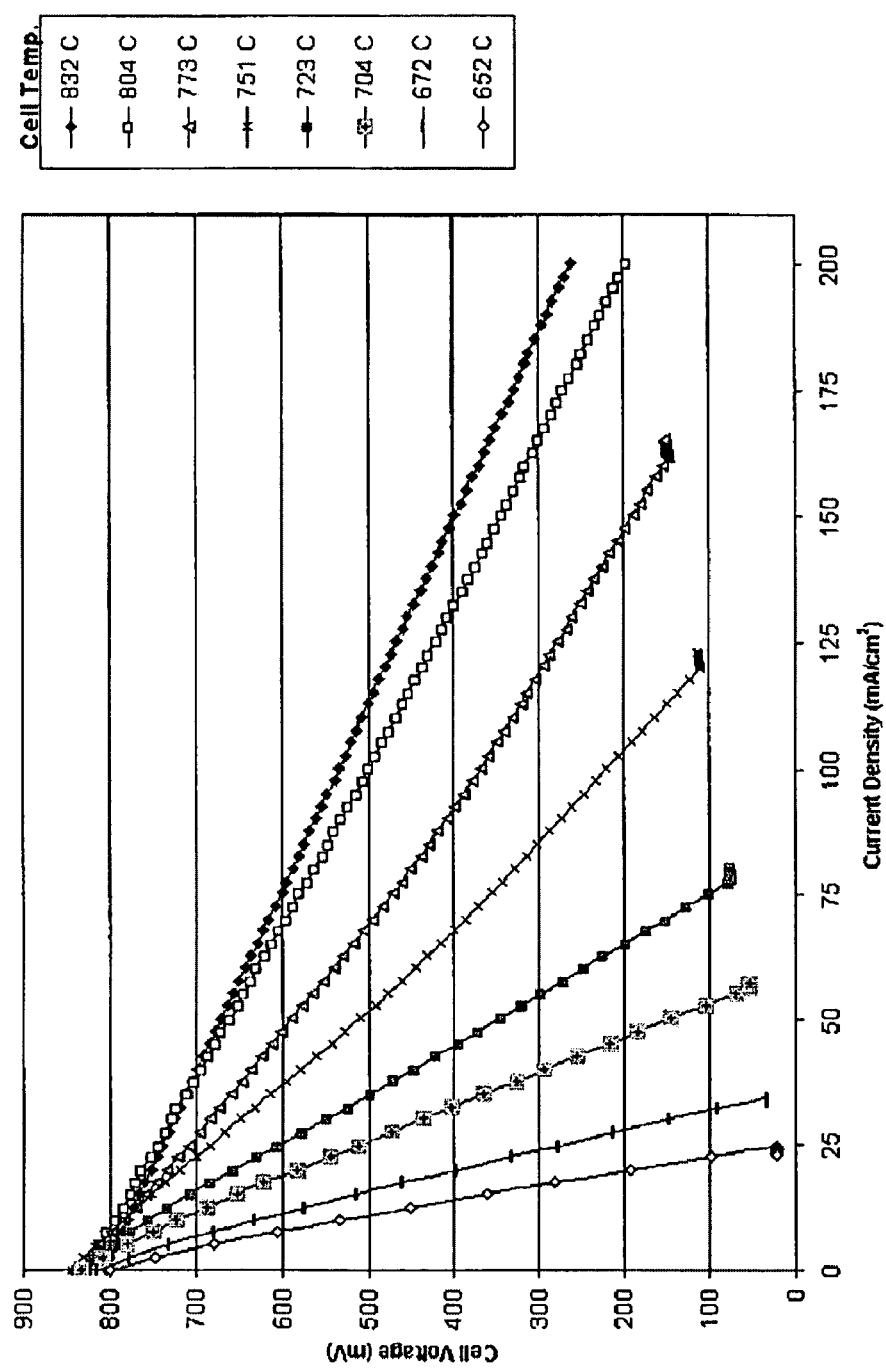
FIG. 4 graphically depicts the voltage vs. current characteristic curves at various temperatures between 650° C. and 850° C. for a protonic ceramic fuel cell operated on dry methane.
Figure 5:
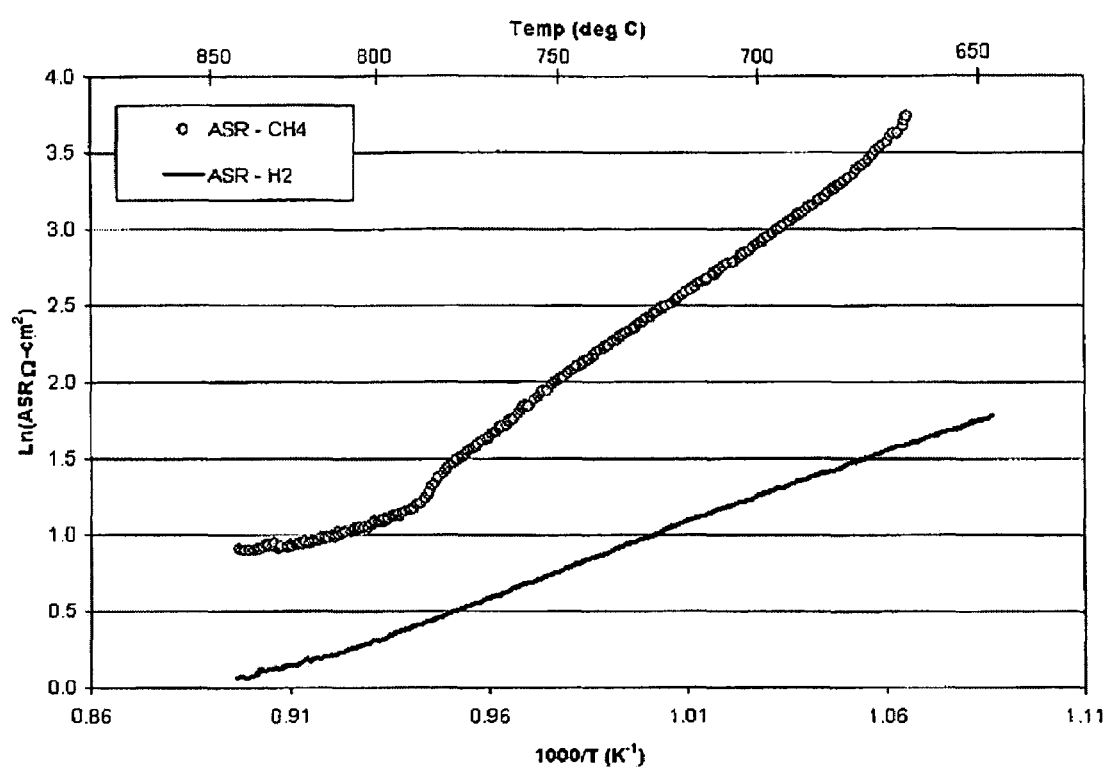
FIG. 5 graphically depicts the area specific resistance comparison of a protonic ceramic fuel cell operating on either pure hydrogen or dry methane fuel as function of temperature in the range from 650° C. to 850° C.
Figure 6:
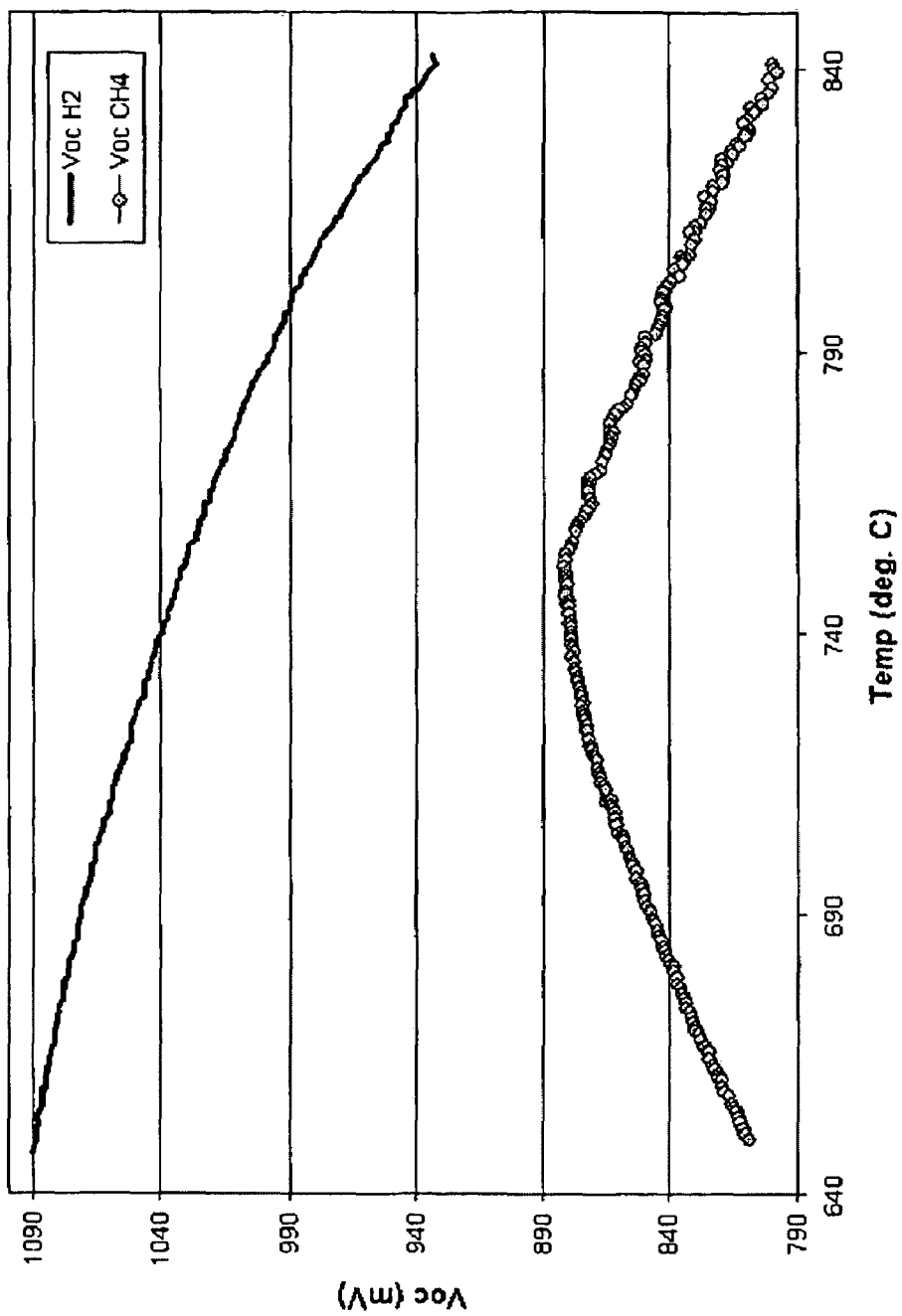
FIG. 6 graphically depicts the open circuit voltage comparison of a protonic ceramic fuel cell operating on either pure hydrogen or dry methane fuel as function of temperature in the range from 650° C. to 850° C.

FIGS. 4, 5 and 6 depict the results of the experiments with hydrogen and methane in this experiment. FIG. 4 graphically depicts the current versus voltage (I-V) characteristics as a function of temperature between 650° C. and 850° C. of the cell operating on dry methane. It can be seen that the curves are typical of a well-performing fuel cell. The I-V curves are nearly straight over the entire range from open circuit to short circuit, indicating that it is the ohmic resistance of the electrolyte that is determining the cell performance rather than some other mechanism. As expected, the slope of each curve gets steeper as the temperature drops, because the protonic conductivity of the electrolyte membrane decreases exponentially with temperature. Below 650° C., cell performance decreased rapidly due to poor catalytic activity of the platinum anode to reforming methane at those temperatures. The maximum power density obtained with this cell was about 60 mW/cm$^2$ at a current density of 150 mA/cm$^2$.

FIG. 5 graphically depicts the direct comparison of Arrhenius plots of the area specific resistance, ASR, for the cell operating on either pure hydrogen or dry methane between 650° C. and 850° C. The curve for the cell operating on hydrogen is nearly straight over the entire temperature range, indicating that a single activation mechanism was responsible, with an activation energy of about 0.55 electron volts (eV). The curve for methane demonstrates a stable region of operation between about 700° C. and 775° C. where the slope of the Arrhenius curve is a straight line. The activation energy of the cell, as determined by the slope of the curve between 700° C. and 750° C., was about 1.35 eV. This is about 0.8 eV greater than the activation energy for the same cell operated on pure hydrogen, and demonstrates that the rate-determining process for the cell was steam permeation, and not proton transport, since the cell running on hydrogen does not depend on steam permeation to operate, while the cell running on methane does. The Arrhenius plot of ASR for the methane cell exhibits other features not observed in the hydrogen cell: a steep rise in slope below 670° C, where reforming efficiency drops off, a discontinuity in the slope at about 800° C., and a decrease in slope above 800° C., where the slope appears to more closely match that of the hydrogen cell.

FIG. 6 graphically depicts the direct comparison of open circuit voltage, $V_{Oc}$, for the cell operated on either pure hydrogen or methane. The plot of the $V_{Oc}$ for methane exhibits a peak at about 750° C., which is the point of maximum catalytic activity of the platinum anode with respect to methane reforming. No such peak occurred in the cell operating on pure hydrogen, which clearly demonstrates that the cell performance was determined by methane reforming and not some other mechanism by which hydrogen might be produced away from the anode.

Since protons are the primary current carrying species in the electrolyte, it is clear that methane is the source of the hydrogen consumed. Hydrogen might be produced by pyrolysis of methane into carbon, but if this were the case, far more carbon would have been deposited in the spiral anode channel in the elapsed time than the total volume available. Subsequent visual inspection of the anode disc after completion of the test showed no sign of carbon deposits. Also, the open circuit voltage versus temperature curves for the cell operating on methane would have matched that of the cell operating on hydrogen. Furthermore, chemical analysis of the exhaust gas collected during the test contained a mixture of carbon monoxide, carbon dioxide and unused hydrogen and methane, showing that hydrocarbon reforming had occurred. The high open circuit voltages in the experiment demonstrates clearly that methane is being reformed at the anode by reactions (1.1) and (1.2) in an efficient manner.

Other cells have been operated on a variety of hydrocarbon fuels including, methane, methanol, propane, ethanol, lamp oil (liquid paraffin), kerosene, diesel fuel, and pure carbon monoxide with similar results.

Cells may also be operated on solid carbon fuels including coal, and pyrolized biomass, among other solid carbon materials. In the case of a PCFC operating on solid carbon fuel, the steam may permeate through the electrolyte membrane and react with carbon in the anode chamber by the reaction,

$$C(s) + H_2O(g) \rightarrow CO(g) + H_2(g) \qquad (1.8)$$

This reaction is endothermic ($\Delta H_{1000} = 136$ kJ/mol), consuming some of the heat generated by the operation of the cell. The hydrogen produced is immediately available to fuel the PCFC, and additional water vapor from steam permeation converts the carbon monoxide to carbon dioxide and more hydrogen by the shift reaction. The chemical reaction, including electromechanical reactions at the anode and cathode, may be represented by,

$$C(s) + O_2(g) \rightarrow CO_2(g) \qquad (1.9)$$

where the free-energy of the reaction is $\Delta G_{1000} = -395.9$ kJ/mol.

In implementation, the solid carbon may be a loose or compacted powder introduced into the anode chamber prior to heating the fuel cell to an operating temperature of about 700° C. The anode chamber may be airtight to reduce or prevent the oxidation of the carbon by oxygen in the air. Air may be removed from the anode chamber by, for example, forming a vacuum in the chamber or displacing the air with an inert gas (e.g., substantially pure $N_2$) and/or reducing gas.

If the anode chamber is pre-charged with a quantity of solid carbon prior to sealing, the fuel cell may operate until the carbon is substantially consumed, after which the fuel cell may be cooled to permit more solid carbon fuel to be added to the cell. In other embodiments, a solid carbon source (e.g., carbon powder, solid carbon fuel rods, etc.) may be automatically fed to the PCFC.

A porous metallic or mixed conducting ceramic material may be applied to the anode side of the protonic ceramic electrolyte. The anode may be constructed to permit the free exchange of reacting gases while maintaining a low resistance current path for the electrons that flow into the external circuit. Water vapor is free to diffuse from the surface of the electrolyte membrane to the surface of the solid carbon fuel, and free to react with gaseous carbon monoxide. Hydrogen that is generated may diffuse to the anode to power the cell. Since a net reaction at the anode chamber produces one mole of carbon dioxide gas for each mole of solid carbon consumed, the carbon dioxide may be vented from the anode chamber to prevent overpressurization, or further converted to $CO_2$ by the water gas shift reaction with additional steam permeating through the electrolyte membrane.

Since solid carbon may be electrically conducting, a solid carbon fuel rod may be used as the anode current collector to simplify the fuel cell design by maintaining contact between the anode and the fuel rod.

The fuel cell cathode for a solid carbon fuel PCFC may be an air cathode similar to the ones used for PFCFs that consume hydrogen or hydrocarbon fuels.

The steam permeation flux through a protonic ceramic electrolyte membrane depends on the water vapor partial pressure gradient between the air side and the fuel side. Steam may continue to permeate into the anode chamber until the partial pressure of water vapor is the same on both sides of the electrolyte membrane. The anode chamber may be sealed (except to permit venting of carbon dioxide) and hydrogen gas may accumulate when the PCFC is not producing current. When the cell is generating current, the hydrogen gas will be consumed. The steam flux may increase to compensate up to the permeation limit of the electrolyte membrane. If the current drawn from the cell exceeds the rate at which hydrogen can be produced in the anode chamber, a concentration polarization may result, and the cell voltage may drop. If the cell produces hydrogen faster than it is being consumed, both the hydrogen and the water vapor partial pressure may rise until equilibrium is reached.

The principles, preferred embodiments and modes of operation of the present invention have been described in the foregoing specification. The invention, which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

What is claimed is:

1. A process for converting a carbon containing fuel and water vapor into a reformate gas comprising hydrogen, carbon monoxide and carbon dioxide, using water molecules that diffuse through a membrane by steam permeation reforming, the process comprising:
   (a) providing a ceramic membrane comprising an oxide ceramic having intrinsic and extrinsic oxygen ion vacancies, and having first and second surfaces; wherein the oxide ceramic capable of reacting with gaseous water molecules at the first surface by the reversible reaction, $H_2O(g)+V_O^{\cdot\cdot}+O^x_O \leftrightarrow 2OH^{\cdot}_O$; and the oxide ceramic capable of producing gaseous water molecules at the second surface by the reversible reaction, $2OH^{\cdot}_O \leftrightarrow H_2O(g)+V_O^{\cdot\cdot}+O^x_O$;

(b) contacting water vapor with the first surface;

(c) contacting the reformate gas with the second surface; whereby solid state ambipolar diffusion of oxygen ion vacancies and protons across the membrane occurs; and the ambipolar diffusion produces a net diffusion flux of water molecules through the membrane from the first surface to the second surface; and, whereby reaction of the water molecules with the carbon containing fuel generates the reformate gas;

whereby the chemical activity of water molecules at the first surface is maintained greater than or equal to the chemical activity of water molecules at the second surface.

2. The process of claim 1, wherein the carbon containing fuel comprises a solid carbon containing fuel.

3. The process of claim 2, wherein the solid carbon containing fuel is coal or pyrolized biomass.

4. The process of claim 1, wherein the carbon containing fuel comprises a solid, electrically conductive carbon fuel rod.

5. The process of claim 4, wherein the carbon fuel rod is an anode electrode in contact with the ceramic membrane.

6. The process of claim 1, wherein the ceramic membrane comprises a perovskite ceramic.

7. The process of claim 6, wherein the ceramic membrane has a nominal stoichiometry of $BaCe_{0.9}Y_{0.1}O_{3-\delta}$, where $\delta$ is 0 to 0.05.

8. The process of claim 1, wherein the ceramic membrane is non-conducting with respect to electrons with an ionic transference number greater than 0.8.

9. The process of claim 1, wherein the ceramic membrane has a protonic conductivity of at least about 5 millisiemens per centimeter at a temperature of 700° C.

10. The process of claim 1, wherein the process occurs at a temperature of 650° C. to 850° C.

11. The process of claim 1, wherein the process occurs at a temperature of about 700° C. to about 750° C.

12. The process of claim 1, wherein the hydrocarbon fuel is selected from the group consisting of methane, methanol, propane, ethanol, liquid paraffin, kerosene, and diesel fuel.

13. The process of claim 1, wherein the hydrocarbon fuel is methane.

14. The process of claim 1, wherein the ceramic membrane has a thickness less than about 1 millimeter.

15. The process of claim 1, wherein the first surface is in contact with air.

16. The process of claim 1, wherein the ceramic membrane is a proton conducting ceramic electrolyte of a fuel cell.

17. The process of claim 16, wherein the fuel cell comprises a cathode in direct contact with at least a portion of the first surface of the ceramic membrane.

18. The process of claim 17, wherein the cathode is selected from the group consisting of metals, metallic alloys, metallic and oxide composites, and mixed conducting oxides.

19. The process of claim 17, wherein the cathode is selected from the group consisting of platinum, a nickel alloy, and a mixed protonic/electronic conducting ceramic cathode less than about 20 microns in thickness.

20. The process of claim 17, wherein the cathode is stable against oxidation and corrosion in moist, oxidizing atmospheres at temperatures less than about 850° C.

21. The process of claim 16, wherein the fuel cell comprises an anode in direct contact with at least a portion of the second surface of the ceramic membrane.

22. The process of claim 21, wherein the anode is selected from the group consisting of metals, metallic alloys, metallic and oxide composites, and mixed conducting oxides.

23. The process of claim 21, wherein the anode is selected from the group consisting of a metallic platinum, a nickel/nickel alloy, and a mixture of nickel oxide and oxide ceramic.

24. A process for generating electricity, comprising:

contacting a reformate gas from a carbon containing fuel source with the anode of a fuel cell and contacting oxygen and water vapor with the cathode of a fuel cell, the fuel cell comprising:

an anode selected from the group consisting of a metallic anode, solid carbon-containing anode, and a mixed conducting anode;

a cathode selected from the group consisting of a metallic cathode and a mixed conducting cathode;

a proton-conducting ceramic electrolyte between the anode and the cathode, wherein the ceramic electrolyte comprises an oxide ceramic having intrinsic and extrinsic oxygen ion vacancies, and having first and second surfaces; wherein the oxide ceramic is capable of reacting with gaseous water molecules at the first surface by the reversible reaction, $H_2O(g)+V_O^{\cdot\cdot}+O^x_O \leftrightarrow 2OH^{\cdot}_O$; and the oxide ceramic is capable of producing gaseous water molecules at the second surface by the reversible reaction, $2OH^{\cdot}_O \leftrightarrow H_2O(g)+V_O^{\cdot\cdot}+O^x_O$; and an external load connecting the anode and the cathode;

establishing a water vapor concentration gradient by having a first partial pressure of the water vapor at the cathode exceed a second partial pressure of water vapor at the anode, and passing water vapor through the electrolyte from the cathode side to the anode side by steam permeation;

converting chemical energy in the form of protons with high electrochemical potential into electrical energy by electrochemical oxidation.

25. The process of claim 24, wherein the carbon containing fuel comprises a solid carbon containing fuel.

26. The process of claim 25, wherein the solid carbon containing fuel is coal or pyrolized biomass.

27. The process of claim 24, wherein the carbon containing fuel is in contact with the anode.

28. The process of claim 24, wherein the anode comprises a solid, electrically conductive carbon fuel rod.

29. The process of claim 24, wherein the reformate gas comprises hydrogen, carbon monoxide and carbon dioxide.

* * * * *

UNITED STATES PATENT AND TRADEMARK OFFICE
CERTIFICATE OF CORRECTION

| | | |
|---|---|---|
| PATENT NO. | : 7,332,237 B2 | Page 1 of 1 |
| APPLICATION NO. | : 10/881720 | |
| DATED | : February 19, 2008 | |
| INVENTOR(S) | : Coors | |

It is certified that error appears in the above-identified patent and that said Letters Patent is hereby corrected as shown below:

On the Title page item (54) and col. 1, line 1, delete "STREAM", and insert --STEAM--.

Signed and Sealed this

Twenty-second Day of July, 2008

JON W. DUDAS
*Director of the United States Patent and Trademark Office*